United States Patent [19]

Ball

[11] Patent Number: 4,798,359

[45] Date of Patent: Jan. 17, 1989

[54] FURNITURE GLIDE

[75] Inventor: Richard I. Ball, Round Lake, Ill.

[73] Assignee: Johnson Industries, Inc., Elgin, Ill.

[21] Appl. No.: 513,625

[22] Filed: Jul. 14, 1983

[51] Int. Cl.⁴ .......................................... F16M 11/20
[52] U.S. Cl. .................................. 248/188.3; 248/649
[58] Field of Search ............... 248/188.3, 188.5, 188.9, 248/649, 650

[56] References Cited

U.S. PATENT DOCUMENTS

| | | | |
|---|---|---|---|
| 2,055,715 | 9/1936 | Barker | 248/188.3 |
| 2,682,131 | 6/1954 | Matter | 248/188.3 |
| 2,695,147 | 11/1954 | Castricone | 248/188.3 X |
| 2,836,843 | 6/1958 | Gallagher | 248/188.3 X |
| 2,890,544 | 6/1959 | Manausa | 248/188.9 |

Primary Examiner—Ramon S. Britts
Assistant Examiner—David M. Purol
Attorney, Agent, or Firm—Edmond T. Patnaude

[57] ABSTRACT

A self-adjusting furniture glide includes an upper body piece rotatably mounted to a lower foot piece having an arcuate ramp surface on which a complimentary ramp surface of the body piece rests, and a coil spring mounted between the foot and body pieces to downwardly bias the foot pieces and to apply a torque which opposes mutual rotation of the pieces.

12 Claims, 1 Drawing Sheet

U.S. Patent    Jan. 17, 1989    4,798,359
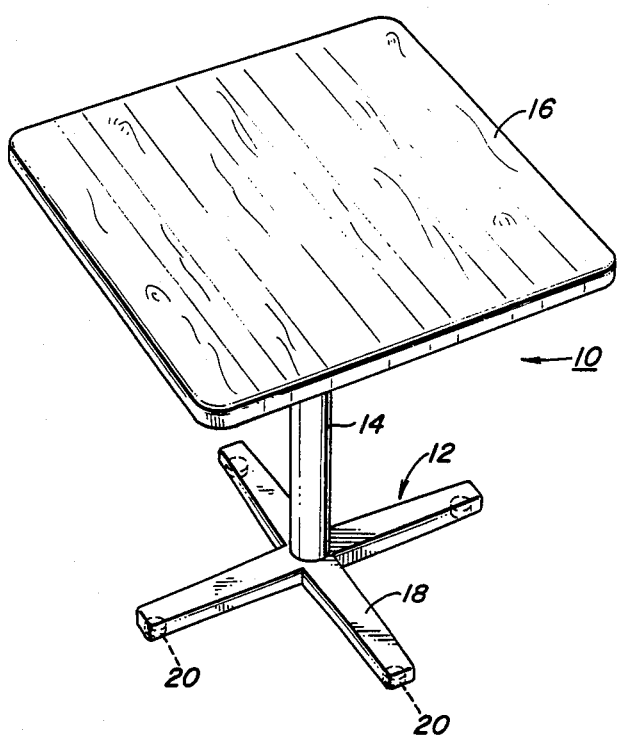
FIG. 1
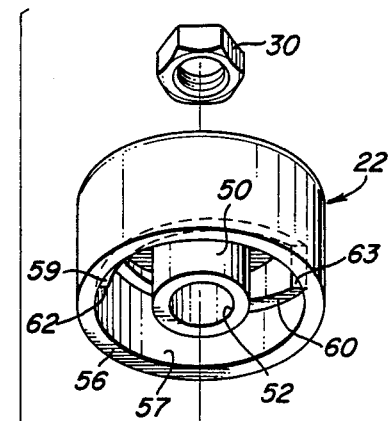
FIG. 2
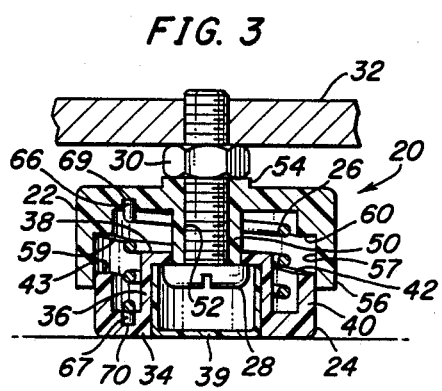
FIG. 3
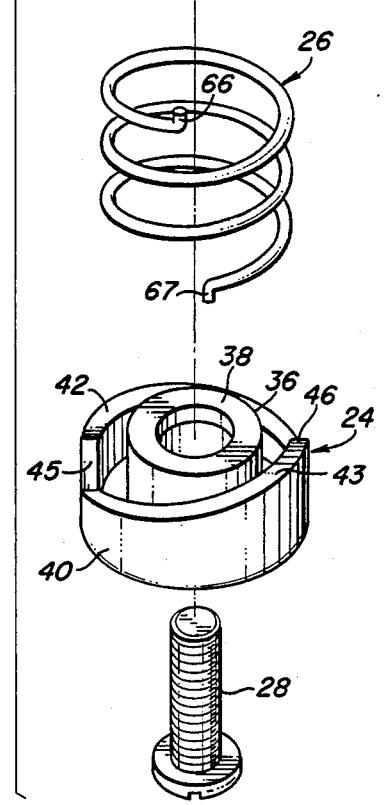

FURNITURE GLIDE

The present invention relates in general to furniture supports, and it relates more particularly to a new and improved furniture support which automatically adjusts to retard rocking or tilting of an associated piece of furniture on an uneven floor.

BACKGROUND OF THE INVENTION

Furniture bases which contact the floor at more than three places are frequently unstable and tend to rock about the line connecting two of the contact points. This instability is particularly annoying with tables, and for that reason many different types of adjustable furniture supports have been designed and marketed. In some cases the supports were self adjustable while in some cases they were manually adjustable. Where the table or other piece of furniture was frequently moved on an uneven floor, as for example, in a restaurant, the manually adjustable supports were unsatisfactory because of the frequent need for adjustment. On the other hand, the self-adjusting furniture supports of the prior art were in some cases expensive to manufacture, were often fragile and susceptible to damage, and in many cases did not function satisfactorily. In Pat. No. 3,827,663 there is described a self-adjusting furniture glide which is easily adjusted by pushing the piece of furniture along the floor. Where the surface of the floor resists such sliding movement, such glides are not so easily adjusted.

It would, therefore, be desirable to provide a furniture glide or other support which responds either to sliding or to lifting the subsequent lowering of the associated piece of furniture to self-adjust in length so as to automatically compensate for the unevenness of the floor on which it is supported.

SUMMARY OF THE INVENTION

Briefly, there is provided in accordance with the present invention a new and improved furniture support which comprises upper and lower mutually rotatable parts having mutually abutting ramp surfaces. The upper part is rotatable relative both to the bottom part and to the furniture and a coil spring is connected between the two parts to urge them apart and to apply a torque which resists upward movement of the lower part.

When the weight is removed from the self-adjusting support, the upper part is rotated by the spring and the spring simultaneously expands to press the lower foot part in a downward direction toward the floor. When the piece of furniture is subsequently lowered so as to rest only on its associated furniture supports, the lower foot parts of the self-adjusting supports will move up until the weight on the respective support is balanced by the spring and the friction between the abutting ramp surfaces.

The ramp angle is selected such that the upper and lower parts are not jammed or locked together under the weight of the furniture with which the supports are used, but rather the upper part rotates to permit the lower foot part to move down into engagement with the floor or to move up until the weight thereon is balanced.

An advantage of the furniture support of this invention is that it is relatively inexpensive to manufacture, wherefore it becomes economical to use such supports on all of the legs of the associated table or other piece of furniture.

GENERAL DESCRIPTION OF THE DRAWING

The present invention will be better understood by a reading of the following detailed description taken in connection with the accompanying drawing wherein:

FIG. 1 is a perspective view of a table including a plurality of furniture supporting glides embodying the present invention;

FIG. 2 is an exploded perspective view of one of the furniture supports shown in FIG. 1; and FIG. 3 is a vertically cross-sectioned view of the furniture support shown in FIG. 2 and mounted to the base of a piece of furniture.

DETAILED DESCRIPTION OF A PREFERRED EMBODIMENT OF THE INVENTION

Referring to FIG. 1, there is shown a table 10 having a base 12, a post or pedestal 14, and a table top 16 attached to the top of the post 14. The base 12 includes a plurality of symmetrically disposed legs 18 each resting on one of an equal number of furniture supports 20. Preferably, the supports are all self-adjusting devices of the type described hereinafter, but only one of the supports need be self-adjusting to prevent rocking of the table on most uneven floors.

It will be understood that the pedestal table is shown for purposes of illustration and that the furniture support of the present invention finds use on most any type of table and other pieces of furniture.

Referring now to FIGS. 2 and 3, the self-adjusting furniture support 20 may be seen to include an upper part 22, a lower foot part 24, a coil spring 26, a screw 28 and a nut 30. The upper end of the screw 28 is threadedly received in an internally threaded hole in the bottom of a piece of furniture 32 with which the support 20 is used. The foot part 24 is shown in FIG. 3 in its maximum extended position, and as will be apparent from the following description, with the foot part 24 resting on the floor the weight of the furniture piece 32 will cause the upper part 22 to rotate against the force of the spring 26 and permit the foot part 24 to retract into the upper part 22.

Considered in greater detail, the lower foot part 24, which is preferably molded of plastic has an annular, smooth, planar bottom surface 34 which is adapted to rest on a floor or other supporting surface. The part 24 also includes a centrally disposed, upstanding tubular portion 36 having an inturned annular flange 38 at the top, and a second upstanding tubular portion 40 having a pair of inclined ramps 42 and 43 on its upper end. The ramps each have an angular extent of 180 degrees and are spaced apart by vertical walls 45 and 46. As may be seen in FIG. 2, the head of the screw 28 is larger than the opening through the flange 38 and thus maintains the foot part 34 assembled to the remainder of the support. An end cap 39 is pressed into the central opening in the foot 24 and its outer end lies flush with the bottom surface.

The upper part 22 is also preferably molded of plastic and includes a centrally disposed, depending tubular portion 50 whose internal diameter is larger than the maximum external diameter of the shank of the screw 28 so as to be freely rotatable thereon. The nut 30 is threaded onto the screw 28 above the upper part 22 to secure it in place on the screw. The part 22 also has an annular boss 54 on the top surface which underlies the nut 30 to provide a smooth bearing surface to permit free rotation of the upper part 22 on the shank of the screw 28. It may thus be seen that the screw is a shaft on which the upper part 22 may rotate as well as being a fastening device for attaching the upper and lower parts together and to the associated piece of furniture. The nut 30 is suitably locked in place on the screw 23 in any suitable manner such as by a cement or by staking to prevent spurious movement of the nut on the screw.

The upper part 22 also includes a depending annular wall 56 having a cylindrical inner surface 57 which is larger in diameter than is the outside cylindrical surface of the wall portion 40 of the foot part 24 so that the foot part may move freely within the upper part as the support 20 self-adjusts. Between the annular portions 50 and 56, the upper part 22 is provided with a pair of downwardly facing inclined ramps 59 and 60 which are complimentary to the ramps 42 and 43 on the foot part. The downwardly facing inclined ramps 59 and 60 are sufficiently recessed within the upper part 22 such that annular portion 56 serves as a skirt for protecting the interface between the upper ramps 59 and 60 and lower ramps 42 and 43 against environmental contamination. The upper and lower ramps are held in mutual abutment by the screw 28 and the nut 30 as best shown in FIG. 3. The ramps 59 and 60 are spaced apart by means of vertical walls or shoulders 62 and 63 which abut with the respective shoulders 45 and 46 to limit rotation between the parts 22 and 24.

The coil spring 26 is coaxially disposed relative to the screw 28 and has its upper and lower end portions 66 and 67 offturned. The end portions 66 and 67 extend into respective blind holes 69 and 70 in the parts 22 and 24. The end portions 66 and 67 and the holes 69 and 70 are located so that when the foot part is in the fully extended position as shown in FIG. 3, the spring 26 is slightly compressed and applies a torque between the upper and lower parts 22 and 24 which forces the shoulders 62 and 63 into abutment with the shoulders 45 and 46.

OPERATION

In use, the screw 28 is finger threaded into the threaded opening at the bottom of a table or other piece of furniture and an open end wrench is then placed on the nut 30 and used to tighten the furniture support 20 in place. Additional ones of the supports 20 are then assembled to the piece of furniture the same way. At this time, the foot parts 24 will be held in abutment with the shoulder surfaces 62, 63.

When the associated piece of furniture is then positioned with the furniture supports 20 resting on the floor, the weight of the furniture will exert a downward force on the upper member 22 causing it to rotate and thus move downwardly over the lower foot part 24 until the weight is counterbalanced by the spring 26. It will be understood that the spring 26 must be both twisted and compressed for the foot part 24 to be retracted into the upper part 22. Moreover, the friction between the upper and lower abutting ramp surfaces must also be overcome by the weight on the particular support for such movement to occur.

I have found that ramp surfaces having an inclination of about nine degrees provides a particularly smooth operating self-adjusting support for tables. An inclination of about eight degrees or less will cause the upper and lower parts to be jammed or locked together against rotation when the associated piece of furniture rests on the support 20.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A self-adjusting furniture support for use with a piece of furniture having a bottom base surface comprising in combination
    a shaft means adapted to be mounted to said base of a piece of furniture with said shaft extending in a vertical direction,
    an upper member rotatably mounted on said shaft and having a downwardly facing inclined ramp surface,
    abutment means concentric with said shaft means for spacing said upper member from said base surface and permitting relative rotational movement between said upper member and said base surface,
    a lower foot member mounted to said shaft and having an upwardly facing inclined ramp surface abutting said ramp surface on said upper member, and
    coil spring means mounted in coaxial relationship with said shaft in a compressed state between said upper and lower members to apply a torque between said members and to exert a force in a direction to push said members apart.

2. A self-adjusting furniture support according to claim 1 further comprising
    said spring having a lower end and an upper end
    means on said lower foot member securing the lower end of said spring against movement relative to said lower foot member, and
    means on said upper member securing the upper end of said spring against movement relative to said upper member.

3. A self-adjusting furniture support according to claim 1 wherein
    surfaces have an incline greater than eight degrees.

4. A self-adjusting furniture support according to claim 3 wherein each of said ramp surfaces comprises
    two spiral surfaces having an angular extent of no more than 180 degrees.

5. A self-adjusting furniture support according to claim 4 comprising
    stop means limiting mutual rotation of said members in the direction causing downward movement of said lower foot member.

6. A self-adjusting furniture support according to claim 5, wherein
    said spring means is compressed when said downward movement of said lower foot member is obstructed by said stop means.

7. A self-adjusting furniture support according to claim 6 wherein
    said shaft is an externally threaded member adapted to be threadedly received in an opening at the bottom of an article of furniture.

8. A self-adjusting furniture support according to claim 7, wherein
    the upper end of said shaft extends upwardly from the upper surface of said upper member, and said abutment means comprises a nut threadedly mounted on said shaft over said upper member.

9. A self-adjusting furniture support according to claim 1 wherein
said upper member comprises an annular skirt into which said lower foot member extends.

10. A self-adjusting furniture support according to claim 9 wherein
said downwardly facing inclined ramp surface is enclosed by said skirt.

11. A self-adjusting furniture support according to claim 1 wherein
said upper member is provided with a downwardly opening annular groove,
said lower foot member is provided with an upwardly opening annular groove, and
the upper and lower turns of said coil spring means are respectively disposed in said annular grooves.

12. A self-adjusting furniture support according to claim 1 wherein
the two end portions of said coil spring means respectively extend parallel to the principal longitudinal axis of said spring means, and
said upper and lower members are respectively provided with openings into which said end portions respectively extend.

* * * * *